July 7, 1936.  E. G. GARTIN  2,047,125
ROCK DRILL
Filed Aug. 24, 1934
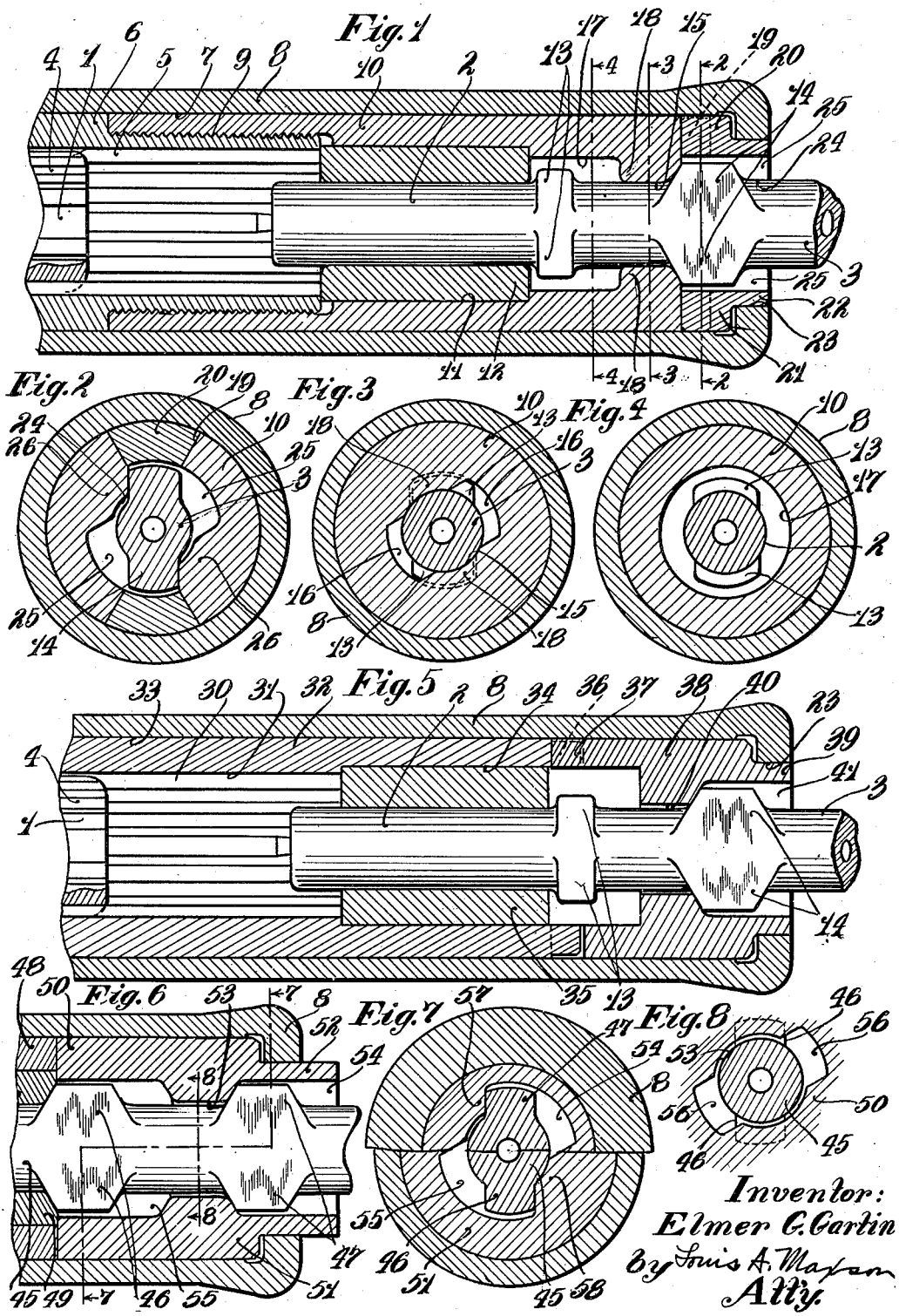
Inventor:
Elmer G. Gartin
By Louis A. Maxon
Atty.

Patented July 7, 1936

2,047,125

UNITED STATES PATENT OFFICE 2,047,125

ROCK DRILL

Elmer G. Gartin, Claremont, N. H., assignor to Sullivan Machinery Company, a corporation of Massachusetts Application August 24, 1934, Serial No. 741,311

15 Claims. (Cl. 121—32)

This invention relates to rock drills and more particularly to improvements in the drill steel chuck mechanism of such drills.

An object of this invention is to provide an improved drill steel chuck mechanism for a rock drill. Another object is to provide an improved chuck mechanism for supporting and driving a drill steel and having embodied therein improved means for locking the drill steel within the chuck. Yet another object is to provide an improved drill steel shank structure having improved locking and driving means. These and other objects will, however, hereinafter more fully appear in the course of the following description, and as more particularly pointed out in the appended claims.

In the accompanying drawing there are shown for purposes of illustration several forms which the invention may assume in practice.

In this drawing,—

Fig. 1 is a longitudinal sectional view through the forward portion of a hammer rock drill with which one illustrative form of the improved chuck mechanism is associated.

Fig. 2 is a cross sectional view taken on line 2—2 of Fig. 1.

Fig. 3 is a cross sectional view taken on line 3—3 of Fig. 1.

Fig. 4 is a cross sectional view taken on line 4—4 of Fig. 1.

Fig. 5 is a longitudinal sectional view similar to that shown in Fig. 1 showing a modified form of chuck mechanism.

Fig. 6 is a fragmentary, longitudinal sectional view showing still another form of the invention.

Fig. 7 is a cross sectional view taken on line 7—7 of Fig. 6.

Fig. 8 is a detail cross sectional view taken on line 8—8 of Fig. 6.

In the illustrative embodiment of the invention disclosed in Figs. 1 to 4, inclusive, the improved chuck mechanism is shown embodied in a rock drill of the pressure fluid actuated hammer type comprising a reciprocable hammer piston having a forward striking bar 1 adapted to deliver impact blows to the shank 2 of a lugged drill steel 3. As is usual in hammer rock drills of the type disclosed a rotative movement is imparted to the hammer piston as the latter reciprocates and this rotative movement is transmitted to the drill steel 3 so that as the latter is percussively actuated by the hammer piston it is at the same time rapidly rotated. The piston striking bar is provided with longitudinal grooves 4 interlocked with straight vanes 5 formed internally within a chuck nut 6 rotatably mounted in the bore 7 of a chuck housing 8. This chuck nut is threadedly connected at 9 to a chuck sleeve 10 likewise rotatably mounted in the chuck housing bore 7 and this chuck sleeve has pressed in a bore 11 therein a chuck bushing 12 which receives and supports the drill steel shank 2, the latter, in this instance, being of cylindrical form. In this illustrative embodiment of the invention, the drill steel has formed thereupon in longitudinally spaced relation with respect thereto locking lugs 13 and driving lugs 14, and the forward end of the chuck sleeve 10 is provided with a key opening or slot 15 having lateral enlargements 16 (see Fig. 3) for receiving the locking lugs 13. When the drill steel shank is in the position shown in Fig. 1 the locking lugs 13, having passed through the key slot 15, are arranged in an enlarged chamber 17 within the chuck sleeve and the locking lugs 13 are located in back of the locking portions 18 at the sides of the key slot enlargements 16, as shown in Fig. 3. The forward end of the chuck sleeve is provided with clutch jaws 19 with which are interlocked, as clearly shown in Fig. 2, clutch teeth 20 formed on a drive sleeve 21. This drive sleeve has a cylindrical shell portion 22 which projects into an opening 23 in the forward end of the chuck housing 8, and has formed therein a bore 24 having lateral enlargements 25, 25, and there are drive lugs 26, 26 arranged between these enlargements. When it is desired to insert the drill steel shank within the chuck mechanism, the operator grasps the steel body and inserts the locking lugs 13, 13 through the enlargements 16, 16 of the key opening 15 and slides the steel shank within the chuck bushing 12, into the position shown in Fig. 1, and as the steel shank is slid rearwardly into this position the driving lugs 14 enter the enlargements 25, 25 of the chamber of the drive sleeve 21. When the parts are thus positioned, the operator rotates the steel shank to move the locking lugs 13 in back of the locking portions 18 of the key slot, thereby locking the steel shank within the chuck sleeve. As the steel is rotated into this locked position the driving lugs 14 move laterally in the bore enlargements 25 until the sides of the driving lugs engage with the adjacent sides of the drive lugs 26, 26 on the drive sleeve 21. When the hammer piston is reciprocated to deliver impact blows to the drill steel shank, the rotative movement of the piston is transmitted through the longitudinal grooves 4 on the striking bar, the vanes 5 of the chuck nut, the chuck sleeve 10, and the drive sleeve 21, the lugs 26 of this drive sleeve engaging and driving the lugs 14 on the drill steel. As the drill steel is percussively actuated by the hammer piston, its release from the steel chuck is prevented by the locking portions 18 on the chuck sleeve engaging the locking lugs 13 on the steel shank.

In the modified form of the invention shown in Fig. 5 the drill steel shank structure is similar to that shown in Fig. 1 and the rock drill hammer motor is substantially the same. In this instance the piston striking bar has its grooves 4 interlocked with straight vanes 30 formed internally within a bore 31 in a chuck sleeve 32, the latter in turn rotatably mounted in a bore 33 formed in the chuck housing 8. Pressed in a bore 34 in the chuck sleeve 32 is a chuck bushing 35 which receives and supports the drill steel shank 2. In this instance, the steel locking means and the driver member are incorporated in a common element and the forward end of the chuck sleeve 32 is provided with chuck jaws 36 with which are clutched clutch teeth formed on a combined locking and driving member 38 also rotatably mounted in the bore of the chuck housing 8. This member has a sleeve-like portion 39 which projects through the opening 23 in the forward end of the chuck housing. The member 38 has formed therein a key opening or slot 40, similar to the key opening in the chuck sleeve 10 in the form of the invention above described, and there is also formed therein a drive chamber 41 similar to the chamber 24 in the element 21 of the structure above described. When it is desired to insert the drill steel within the chuck mechanism the operator grasps the steel body and inserts the locking lugs 13 through the lateral enlargements of the key opening 40 and shoves the steel shank rearward into the position shown, within the chuck bushing 35. As the steel shank is moved rearwardly into the position shown the drive lugs 14 enter the chamber 41, and when the steel shank is thus positioned the operator rotates the shank to lock the locking lugs in back of the locking portions at the sides of the key slot enlargements in the manner above described. When the hammer piston actuates percussively the drill steel shank, the rotative movement of the piston is transmitted through the straight grooves 4 on the striking bar and straight vanes 30 on the chuck sleeve 32 and thence through the driver member 38, the lugs on the latter engaging the lugs on the steel shank, while the steel shank is retained locked in the chuck by the locking lugs 13. In both forms of the invention above described the steel shank is released from the chuck simply by rotating the steel to bring the locking lugs 13 into registry with the key hole slot and then by axial withdrawal of the steel from the chuck.

In the modified form of the invention shown in Figs. 6, 7, and 8 the drill steel shank 45 has formed thereon in longitudinal spaced relation with respect thereto, lugs 46 and 47, these lugs being similar in shape to the lugs 14 of the form of the invention above described, but, in this instance, the rear lugs 46 are driving lugs as well as locking lugs, while the front lugs 47 have only a driving function. As in the forms of the invention above described there is rotatable in the chuck housing bore a chuck sleeve 48 having pressed in the forward portion thereof a chuck bushing 49 which receives and supports the drill steel shank. Clutched to the forward end of the chuck sleeve at 50 is a locking and driving member 51, the latter having a forward cylindrical portion 52 which projects through the bore in the forward end of the chuck housing. The member 51 is also provided with a key hole slot 53, a front drive chamber 54 and a rear drive chamber 55. The key hole opening 53 is provided with lateral enlargements 56, 56 for receiving the locking lugs 46, and when the steel shank is located in position in the chuck mechanism the steel is rotated to bring the lugs 46 in back of the locking portion of the key hole opening. When the steel is turned into locked position with the chuck the lugs 46 and 47 of the steel move into engagement with the drive lugs 57 and 58 formed within the locking chambers 54 and 55, respectively. Thus when the drill steel is actuated percussively by the hammer piston the rotative movement of the piston is transmitted through the chuck sleeve 48 and driver member 51 to the steel shank, the drive lugs 57 on the driver member engaging the lugs on the steel shank, and the steel shank is retained in the chuck by the lugs 46. When it is desired to release the steel shank from the chuck the steel is rotated to bring the lugs 46 into registry with the key hole opening 53, thereby permitting axial withdrawal of the steel.

As a result of this invention it will be noted that an improved drill steel chuck mechanism is provided having associated therewith an improved drill steel shank structure whereby the drill steel is supported, driven and locked within the chuck mechanism in an improved manner. It will further be noted that by providing separate locking and driving lugs on the drill steel shank, relatively large wearing surfaces are provided, thereby reducing steel shank wear and breakage. It will further be noted that the drill steel driver element is formed in a single piece, and as this piece becomes worn the latter can be replaced without replacing the other parts of the chuck mechanism. These and other uses and advantages of the invention will be clearly apparent to those skilled in the art.

While there are in this application specifically described several forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a drill steel chuck mechanism, in combination, a drill steel having a shank formed with supporting lugs spaced apart longitudinally thereof, one a locking lug and the other a driving lug, and a rotatable chuck for receiving said drill steel shank and having locking and driving means cooperating respectively with said locking and driving lugs.

2. In a drill steel chuck mechanism, in combination, a drill steel having a shank formed with supporting lugs spaced apart longitudinally thereof, one a locking lug and the other a driving lug, said locking lug also having a driving function and cooperating with said driving lug in the rotation of the drill steel, and a rotatable chuck for receiving the drill steel shank and having locking and driving means cooperating with said locking and driving lugs respectively and also having driving means cooperating with said locking lug.

3. In a drill steel chuck mechanism, in combination, a drill steel shank having locking and driving lugs, a rotatable chuck sleeve having a locking chamber for receiving said locking lug, and a driver member connected to said chuck sleeve and having a driving chamber for receiving said driving lug, said lugs being spaced apart longitudinally of the steel shank and said chuck sleeve having locking means projecting in the space between said lugs.

4. In a drill steel chuck mechanism, in combination, a drill steel shank having a driving lug and a locking lug, and a rotatable driver member having locking and driving chambers, one chamber receiving said locking lug and the other receiving said driving lug, said lugs being spaced apart longitudinally of the steel shank and said driver member having locking means projecting in the space between said lugs.

5. In a drill steel chuck mechanism, in combination, a drill steel shank having a driving lug and a locking lug, and a rotatable driver member having locking and driving chambers, one chamber receiving said locking lug and the other receiving said driving lug, and having formed therein a key hole opening between said chambers through which the locking lug must be passed upon insertion of the steel shank within the chuck mechanism, the steel being rotatable upon insertion thereof within the chuck mechanism to lock the locking lug within the locking chamber.

6. In a drill steel chuck mechanism, in combination, a drill steel shank having locking and driving lugs, a rotatable chuck sleeve having a locking chamber and a key hole opening for receiving the locking lug for locking the lug in the locking chamber, and a driver member clutched to the chuck sleeve and having a driver chamber for receiving the driving lug and having driving lugs thereon engaging said driving lug on the steel shank.

7. In a drill steel chuck mechanism, in combination, a drill steel shank having locking and driving lugs, and rotatable driving and locking members having driving and locking chambers for receiving said driving and locking lugs and having formed between said chambers a key hole opening through which the locking lug must be passed upon insertion thereof within the locking chamber, said members having formed therein in the driving and locking chambers driving lugs engaging said locking and driving lugs on the steel shank.

8. In a drill steel chuck mechanism, in combination, a drill steel shank having a driving lug and a locking lug, said lugs spaced longitudinally of said steel shank, and rotatable driving and locking means having locking and driving recesses, one recess receiving said locking lug and the other receiving said driving lug, and having a locking portion past which said locking lug must be moved upon insertion of the steel shank within the chuck mechanism, the steel shank and locking and driving means being relatively rotatable to lock the locking lug within said locking recess.

9. In a drill steel chuck mechanism, in combination, a drill steel shank having a driving lug and a locking lug, said lugs spaced longitudinally of said steel shank, and rotatable driving and locking means having locking and driving recesses, one recess receiving said locking lug and the other receiving said driving lug, and having a locking portion between said recesses and projecting within the space between said lugs, said locking lug being movable past said locking portion upon insertion of the steel shank within the chuck mechanism, the steel shank and locking and driving means being relatively rotatable to lock the locking lug within said locking recess.

10. In a drill steel chuck mechanism, in combination, a drill steel shank having locking and driving lugs, said lugs spaced longitudinally of said steel shank, and rotatable driving and locking means having driving and locking recesses for receiving said driving and locking lugs respectively, and having a locking portion past which said locking lug must be moved upon insertion thereof within said locking recess, said means having driving means engaging said locking and driving lugs on the steel shank.

11. In a drill steel chuck mechanism, in combination, a drill steel having a shank formed with supporting lugs spaced apart longitudinally thereof, one a locking lug and the other a driving lug, and a rotatable chuck for receiving said drill steel shank and having locking and driving means cooperating respectively with said locking and driving lugs, said chuck locking means including a locking portion projecting in the space between said lugs.

12. In a drill steel chuck mechanism, in combination, a drill steel having a shank formed with supporting lugs spaced apart longitudinally thereof, one a locking lug and the other a driving lug, said locking lug also having a driving function and cooperating with said driving lug in the rotation of the drill steel, and a rotatable chuck for receiving the drill steel shank and having locking and driving means cooperating with said locking and driving lugs respectively and also having driving means cooperating with said locking lug, said chuck locking means including a locking portion projecting in the space between said lugs.

13. In a drill steel chuck mechanism, in combination, a drill steel having a shank formed with supporting lugs spaced apart longitudinally of the shank, one a locking lug and the other a driving lug, a rotatable chuck for receiving the drill steel shank and having locking means cooperating with said locking lug, and a separate driver member connected to said chuck and having driving means cooperating with said driving lug.

14. In a drill steel chuck mechanism, in combination, a drill steel having a shank formed with supporting lugs spaced apart longitudinally of the shank, one a locking lug and the other a driving lug, a rotatable chuck for receiving the drill steel shank and having locking means cooperating with said locking lug, and a separate driver member connected to said chuck and having driving means cooperating with said driving lug, said locking means having a locking portion projecting within the space between said lugs, and said driver member connected to said chuck in advance of said locking portion.

15. In a drill steel chuck mechanism, in combination, a drill steel having a shank formed with supporting lugs spaced apart longitudinally thereof, one a locking lug and the other a driving lug, a rotatable chuck for receiving the drill steel shank and having locking means cooperating with said locking lug, and a driving ring clutched to said chuck and through which the steel shank is inserted within the chuck, said driving ring having driving means cooperating with said driving lug.

ELMER G. GARTIN.